United States Patent [19]
Torian et al.

[11] 3,856,237
[45] Dec. 24, 1974

[54] GUIDANCE SYSTEM

[75] Inventors: John T. Torian, Jackson Heights; Richard W. Safford, Huntington, both of N.Y.

[73] Assignee: Fairchild Hiller Corporation, Hagerstown, Md.

[22] Filed: Aug. 3, 1967

[21] Appl. No.: 661,164

Related U.S. Application Data

[63] Continuation of Ser. No. 402,377, Oct. 6, 1964, abandoned.

[52] U.S. Cl.............. 244/3.11, 244/3.14, 343/5 MM, 343/11
[51] Int. Cl. .......................... F41g 7/00, G01s 9/02
[58] Field of Search ....... 244/3.11, 3.12, 3.14, 3.17; 343/5 MM, 11

[56] References Cited
UNITED STATES PATENTS

| | | | |
|---|---|---|---|
| 2,632,157 | 3/1953 | Jones | 343/11 X |
| 2,649,262 | 8/1953 | Fahrney | 244/3.14 X |
| 3,001,186 | 9/1961 | Baltzer | 343/6 |

*Primary Examiner*—Malcolm F. Hubler
*Attorney, Agent, or Firm*—Darby & Darby

[57] ABSTRACT

A selectively controlled radiant energy mapping apparatus having a separate transmitter and receiver located, respectively, in a controllable vehicle and at a predetermined location relatively remote from the vehicle, is used to illuminate a target area with radiant energy susceptible of being reflected from at least some portions of the target area to enable an image of the target area to be received by the receiver. This image provides information concerning the intended convergence of the controllable vehicle and the target, and preferably may relate to the azimuthal orientation and pitch orientation of the controllable vehicle relative to the target.

8 Claims, 7 Drawing Figures

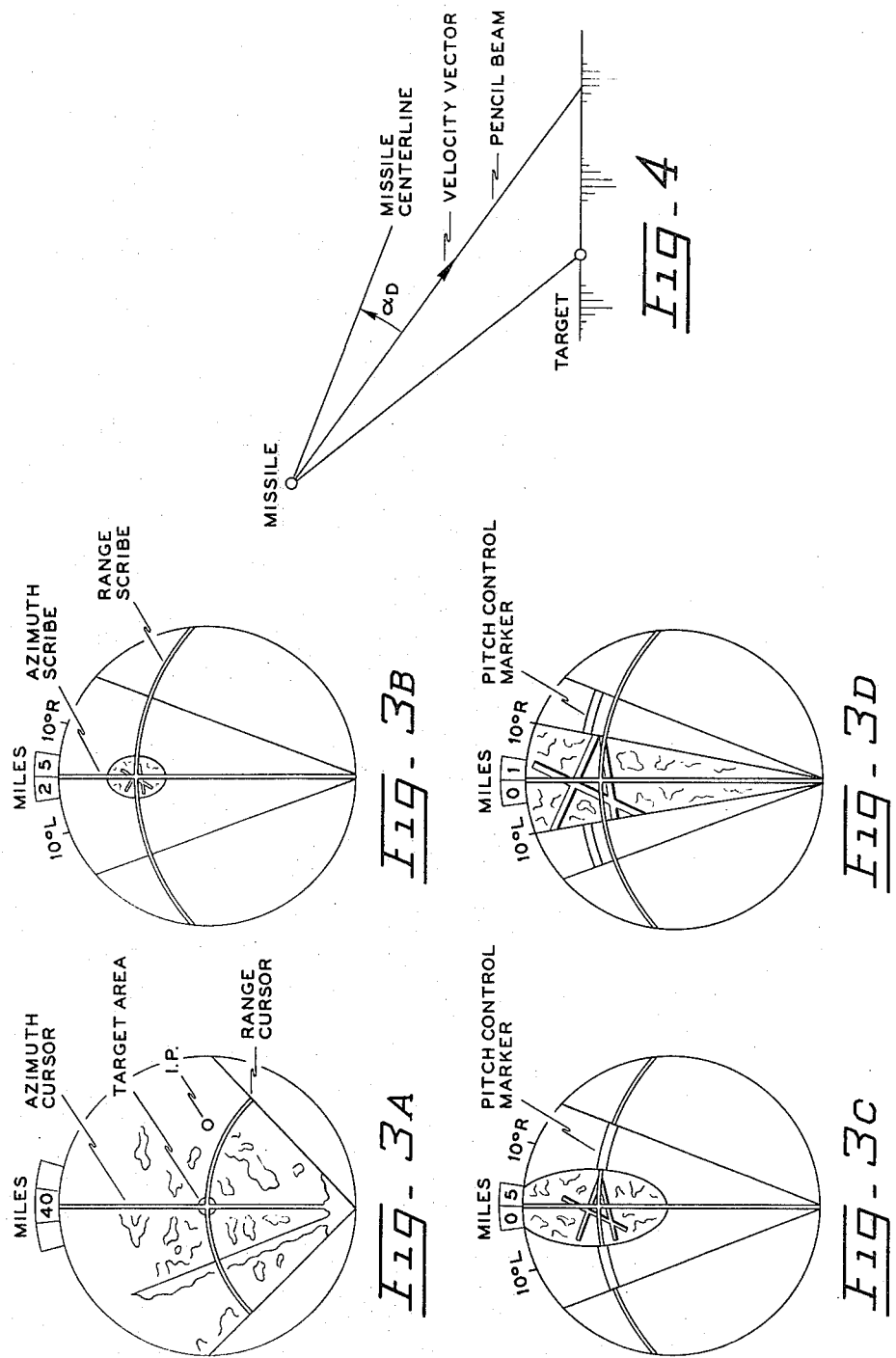

GUIDANCE SYSTEM

This is a continuation of application Ser. No. 402,377, filed Oct. 6, 1964, now abandoned.

The present invention relates to a remote guidance system for a vehicle, and, more particularly, to novel methods and systems for controlling a directionally controllable vehicle in its movement toward a selected target from a control point adapted to be relatively remote from both the controllable vehicle and the target.

Known types of convergence guidance systems employ "fully active" radiant energy target sensing means, e.g., a fully active search radar having both a transmitter and receiver in the nose of a missile. Target returns are received by the missile and re-transmitted through a video data link to the launch aircraft where they are displayed on a visual display device, such as a plan position indicator (P.P.I.). A missile guidance operator selects the target from the display information and transmits steering commands to the missile, which is then directed toward the target.

Such a system has a number of significant disadvantages. For example, the provision of a fully active radar sensor and other requisite related items such as a video data link transmitter on board an expendable missile is very costly, the weight factor is highly significant and there is great complexity in the number and layout of required physical elements for the control system, aside from the payload, and fuel-carrying and power drive equipment. Furthermore, unlike the radar system, the video data link suffers its maximum path attenuation as the missile closes on the target and the missile-to-launch aircraft distance is greatest; notwithstanding the fact that the most critical guidance decisions must be made during this terminal portion of the missile's flight. Since the quality of the resultant radar display at the control point can be no better than the quality of the video data link transmission, the full benefits of prior art convergent systems are compromised.

These and other disadvantages are obviated or significantly lessened in accordance with the invention, wherein a selectively controlled radiant energy mapping means having separate transmitting means and receiving means respectively located in the controllable vehicle and at a predetermined location relatively remote from the vehicle is used to illuminate a target area, understood to contain what may be a previously selected target, with radiant energy susceptible of being reflected from at least some portions of the target area to enable an image of the target area to be received by the receiving means, thereby providing information concerning the intended convergence of the controllable vehicle and the target. The information provided by the image producing means preferably may relate to the azimuthal orientation and pitch orientation of the controllable vehicle relative to the target. In the semi-active systems of the invention, wherein a significant improvement may be obtained in the quality of the control information with its attendant benefits, substantial savings in cost, complexity, and weight, in the expendable missile are also effected by the elimination of at least either the transmitting or receiving equipment of the mapping means from the expendable missile, and, in the latter case, the video data link.

In a preferred embodiment of the invention, the transmitting means of the radiant energy mapping means is located in the directionally controllable vehicle and the receiving means is positioned at a point relatively remote from the vehicle, for example, positioned in the launch aircraft. In this embodiment, the need for a video data link between the controllable vehicle and the control point, such as the launch aircraft, is eliminated, because a visual display may be available directly at the control point, obviating any need for transmitting the display or other information relative thereto from the controllable vehicle to the control point.

Suitable synchronization may be employed to synchronize the operation of the radiant energy transmitting means in the controllable vehicle and the remote image producing receiving means, so as to render the image most meaningful.

The function of the guidance system of the invention is merely to directionally control the movement of the controllable vehicle toward the target, the range capabilities of the controllable vehicle being known and the decision to launch the controllable vehicle on its intended movement toward convergence with the target having been made. Therefore, specific knowledge of the range factor is not one of the principal criteria in the system and the fact that the range between the controllable vehicle and the target, and the target and the receiving means may be continuously varying in paths of unequal length is not material.

The selectively controlled radiant energy mapping means of the invention provides a continuous display of the azimuthal position of the controllable vehicle as it approaches convergence with the target. In the case of a guided missile launched, for example, from an aircraft toward a selected target, the elevation of the flight path at launching and during mid-course may be controlled in any suitable conventional manner, and is preferably pre-programmed so that the operator guiding the vehicle is not concerned with its altitude or pitch control. It is only when the controllable vehicle enters its terminal guidance phase on approaching convergence with the target, that it is desirable to have the operator control the pitch of the controllable vehicle. This may be accomplished, in accordance with the invention, by an auxiliary radiant energy transmitting means mounted in the controllable vehicle which is brought into operation as the vehicle enters its terminal guidance phase, to provide a visual indication along with the target area image of the relative slant range from the controllable vehicle to its projected impact point at the target. In this phase, the operator has control over the pitch as well as the yaw of the controllable vehicle so that he can steer the vehicle directly into the target.

For a more complete understanding of the invention, reference may be had to the following detailed description taken in conjunction with the accompanying figures of the drawings, in which.

FIGS. 3A, 3B, 3C, and 3D are exemplary radar displays, in accordance with the invention; and FIG. 4 is an exemplary line diagram of the terminal guidance phase, in accordance with the invention.

Figure 1:
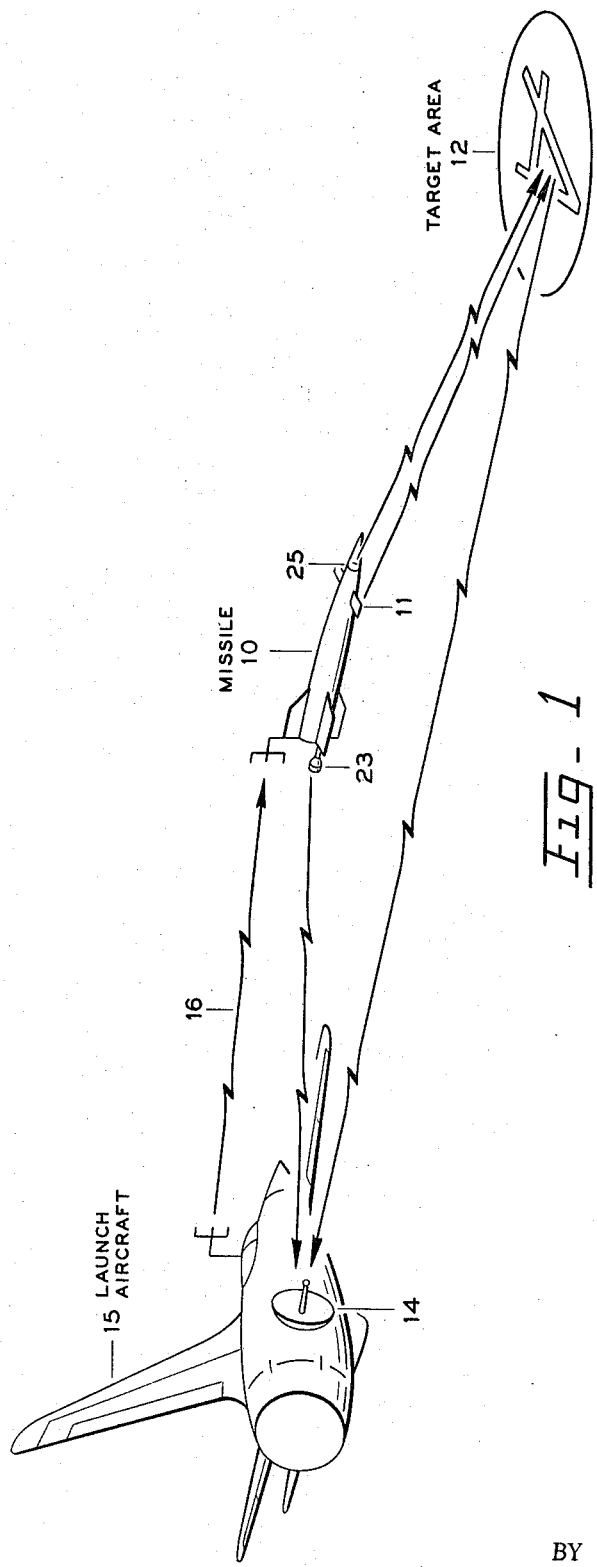
FIG. 1 is a pictorial representation of an exemplary embodiment of the guidance system of the invention in operation.

In FIG. 1, a directionally controllable missile 10 has a radar transmitting means including an antenna means 11 which illuminates a target area 12 with radiant energy having suitable predetermined frequency characteristics and susceptible of reflection from objects within the target area 12, in accordance with well known radar techniques. For example, the antenna means 11 may be of suitable conventional form providing a vertical fan radar beam having an angular beamwidth determined by the aperture of the antenna and the radar frequency selected for scanning the target area 12 through a horizontal scanning sector of a predetermined angular dimension. An exemplary beamwidth, in accordance with the invention, may be such as to intercept the ground of the target area with a width in the order of a half-mile at a launch distance of some 25 to 30 miles, narrowing to a few feet just prior to impact at the point of convergence of the missile or controllable vehicle with the selected target. Azimuth scanning by the radar transmitting means 11 is accomplished in accordance with conventional radar techniques so as to provide, for example, a ±10° scan, the center of which may be biased an additional 10° on either side of the missile's center line. Bias control, which may be effected in a conventional manner, is used to stabilize the scan against high-frequency yaw maneuvers and to adjust for crab angles necessitated by crosswinds, etc.

A radar receiving means is suitably mounted on the launch aircraft 15 and includes a conventional receiving antenna means 14, which must be stabilized against aircraft motions and is suitably designed to provide adequate signal gain to insure a satisfactory radar display. The physical and electrical characteristics of the antenna means 14 may be suitably selected so as to be capable of covering a target area within a predetermined area of uncertainty, such as 2 miles in diameter, with respect to the actual location of an intended target relative to a known identification point, "I.P." The receiving antenna means 14 has a 5° beam, and is adapted to be aimed automatically, in accordance with well known techniques, using data from the aircraft's navigation system.

Directional controls, and other required information, are transmitted from the launch aircraft 15 to the missile 10 through a conventional relatively narrow band command link 16, which in military operations may be designed to operate at relatively low frequencies on a "secured" basis.

The radar transmitting means including the antenna means 11 and the radar receiving means including the antenna means 14 comprise a selectively controlled radiant energy or radar mapping means operating on a "semi-active" basis, in contrast to conventional well known fully-active systems.

Figure 2:
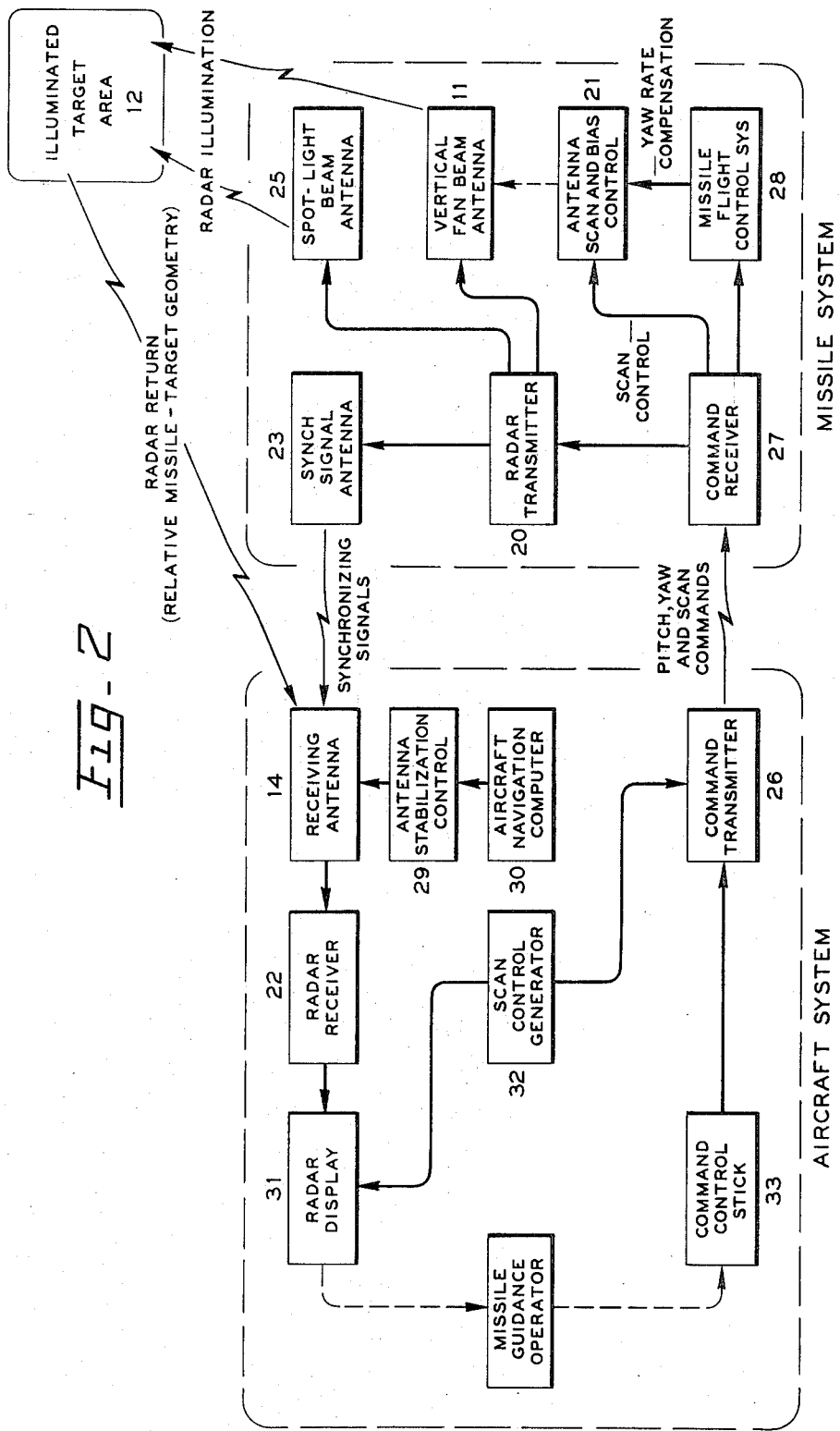
FIG. 2 is a schematic block diagram of the principal components of an exemplary embodiment of the invention.

The radar transmitting means, as shown more particularly in FIG. 2, comprises a radar transmitter 20, the output of which is fed in a conventional manner to the vertical fan beam antenna means 11. The scan and bias control of the antenna means 11 is effected in a conventional manner by an antenna scan and bias control means 21.

The radar transmitter 20 and conventional radar receiver 22 included in the radar receiving means mounted in the launch aircraft are synchronized by means of a timing reference or synchronizing signal. This may be accomplished by transmitting a synchronizing signal, such as a "main bang" pulse from the radar transmitter 20 through a synch signal antenna means 23, which may take the form of a conventional horn antenna mounted on the rear of the missile 10, to the receiving antenna means 14 in the launch aircraft.

A selectively energizable auxiliary radar transmitting means in the form of a conventional pencil or "spotlight" beam antenna means 25 is also mounted on the missile 10 for use during the terminal guidance phase. The pencil beam antenna means 25 may comprise polyrods arrayed in the nose section of the missile 10 and integrated with the vertical fan beam antenna means 11. The pencil beam antenna means 25 is arranged to provide a spot-light beam that points in the direction of the missile's velocity vector.

During predetermined portions of the terminal guidance phase of the missile flight, the spot-light beam antenna means 25 is selectively energized to provide a supplemental illumination of the target area to enable the missile guidance operator in the launch aircraft 15 to determine the pitch orientation of the missile with respect to the target with which the missile is intended to converge. For example, an appropriate command signal is sent from a conventional command transmitter means 26 in the launch aircraft through the secured command link 16 to a conventional command receiver means 27 to cause the output of the radar transmitter means 20 to be switched on a time-shared basis between the vertical fan beam antenna means 11 and the spot-light beam antenna means 25.

Conventional commands are also transmitted over the command link 16 from the launch aircraft 15 to the missile 10 to control the missile flight control system 28 and the antenna scan and bias control means 21, both of which may be of any suitable conventional form.

The scanning orientation and stabilization of the receiving antenna means 14 in the launch aircraft 15 is controlled in a conventional manner by a suitable antenna stabilization and control means 29, which may be operated under the control of the aircraft navigation computer means 30.

The output of the radar receiver 22 is fed in a conventional way to an image producing means such as a suitable radar image display means 31, which may be in the form of a conventional cathode ray tube as used in a plan position indicator. The operation of the radar display means 31 is also controlled in a conventional manner by a scan control generator means 32, which additionally provides scan control signals to the antenna scan and bias control means 21 in the missile 10 through the command link 16 including the command transmitter means 26 and the command receiver means 27.

In response to target area information, appearing on the radar display means 31, the missile guidance operator in the launch aircraft 15 may manually control the azimuthal orientation and the pitch orientation of the directionally controllable missile 10 by means of a suitable command control stick 33 to transmit suitable yaw and pitch command signals to the missile flight control system 28 through the command transmitter means 26 and command receiver means 27.

In operation, the guidance control system of the invention may be readily used by a missile guidance operator having only rudimentary pre-briefing information regarding the character and general location of the intended target. With the aid of the navigation equipment of the aircraft and/or major landmarks at known locations that can be used as identification points, the intended target can, for example, be located within a predetermined circle of uncertainty by means of the conventional forward mapping radar of the aircraft, before the aircraft has closed to within the missile launch range, which may be in the order of 25 to 30 miles. The radar receiving antenna means 14 of the launch aircraft associated with the guidance control system is then directed in azimuth and elevation by any suitable conventional means to point at the target so as to cover the area of uncertainty. The antenna stabilization and control means 29 is then activated to keep the antenna means 14 directed at the target regardless of the maneuvers of the launch aircraft 15. The navigation system including the aircraft navigation computer means 30 of the aircraft may be used to up-date the pointing angles of the receiving antenna means 14 so that the receiving beam continuously covers the target area 12 during pre-launch, launch, and leave maneuvers.

During the identification of the I.P. image and the target area within its circle of uncertainty on the aircraft's conventional forward mapping radar display (FIG. 3A), the missile guidance operator places the azimuth cursor and range cursor over the target area which may automatically orient the receiving antenna means 14.

As soon as the receiving antenna means 14 is oriented the missile radar transmitter means 20 is activated to produce a scanning beam through the vertical fan beam antenna means 11 which illuminates, for example, a 20° sector that is intended to include the 5° sector scanned by the receiving beam of the receiving antenna means 14. Just prior to launching the missile 10, the missile guidance operator checks the image displayed on the radar display means 31 of the missile guidance system to insure that the target area 12 is roughly in the center of the scanned sector. The missile 10 is then launched and the guidance operation is initiated, the launch aircraft and the missile being within line of sight of the target area. Once the launching of the missile has been effected, the launch aircraft 15 is free to take evasive action in a flight path completely independent of that of the missile 10, the only limitation on the launch aircraft 15 being that it remains in line of sight of the target area so that it is capable of receiving reflected radiant energy radar returns from the illuminated target area.

As indicated in the exemplary display of the radar display means 31 associated with the missile guidance control system (FIG. 3B), during the early midcourse phase of the flight of the missile 10 toward the target area 12, the target area selected by the (5°) receiving beam of the receiving antenna means 14 encompasses only a small portion of the 20° sector scanned by the vertical fan beam antenna means 11 of the missile, but as the missile 10 closes on the target, the area of uncertainty covered by the 5° receiving beam expands within the field of view, as shown in FIGS. 3C and 3D.

During the midcourse guidance phase, the missile guidance operator keeps the target area centered in the image produced by the radar display means 31 by transmitting yaw commands to the missile flight control system 28 through suitable operation of the command control stick 33, thereby causing the missile 10 to fly in a pursuit course pointed toward the target. The effect of persistent cross-wind induced crab angles may be overcome by shifting the center of the sector scanned by the vertical fan beam antenna means 11 from the longitudinal axis of the missile 10 by suitable control commands to the antenna bias control means 21.

The vertical flight profile of the missile 10 may be controlled in any conventional way independently of the guidance control means of the invention. For example, depending on the launch conditions, the missile may be automatically controlled to climb or dive to a predetermined pressure altitude, which may be maintained until the terminal guidance phase.

As the missile 10 closes to within 5 to 10 miles of the target, for example, the display resolution of the radar display means 31 improves (FIG. 3C) to the extent that the missile guidance operator can begin to steer the missile 10 toward the region within the illuminated target area 12 that he judges to be the true target. This may be facilitated, in accordance with conventional radar techniques, by continuously expanding the display range scale of the radar display means 31.

At an appropriate range, the missile 10 may be placed in a terminal dive of, for example, 30° to 40° by means of suitable pitch commands transmitted from the command transmitter 26 to the missile flight control system 28.

At the time that the missile is commanded to initiate its terminal dive, or at some appropriate later time, the selectively energized spot-light beam antenna means 25 is energized on a time-shared basis with the vertical fan beam antenna means 11 by the output of the radar transmitter means 20. The radar pulse repetition frequency and antenna scan returns are increased to the limit of the transmitter's capabilities. The resulting image display in the radar display means 31 in the launch aircraft 15 shows a bright band (forming a pitch control marker) generated by the spot-light beam in a conventional manner, but displayed outside the 20° sector (FIGS. 3C and 3D) at the projected impact point. A heightened display intensity along with a faster frame rate reduces image blur between successive scans (FIG. 3D).

During the terminal guidance phase, yaw commands are given over the command link 16 in the same manner as during the midcourse guidance phase, and the missile guidance operator additionally is able to transmit pitch guidance commands so as to be able to control the directionally controllable missile 10 in both pitch and yaw. This is accomplished by keeping the target centered in azimuth on the display with the bright pitch control marker also centered over the target. For example, should the pitch control marker be displayed at a range greater than the intended target, a downward adjustment is called for, (see FIG. 4), whereas an up command would be sent to the missile flight control system 28, if the bright pitch control marker appears at a range short of the target. Steering in both planes continues until impact at the point of convergence of the missile and the intended target, at which point the display in the radar display means 31 is lost.

Throughout the terminal guidance phase, the image presentation of the target in the radar display means 31 steadily improves in resolution, so that if the range scale on the radar display means 31 is appropriately reduced, the target can be maintained in approximately the same position and the resultant image will appear to be expanding in the region of interest.

During the terminal guidance phase, the absolute recognition of the target will develop gradually and a final choice of the desired impact point need not be made until a relatively small distance from the target. In fact, the last effective correction may be made at a distance of less than 1,000 feet from impact with the guidance system being capable of providing a final resultant circular area of probability of impact in the order of a very few feet. The target miss distance is entirely independent of missile launch range or aircraft stand-off range.

In the above description of the present invention, the conventional forward mapping radar means of the launch aircraft 15 were used to initially determine the location of the target area. It is understood that in lieu of such means any other conventional means of locating or determining the position of the target area relative to the aircraft can be employed without departing from the spirit and scope of this invention. For example, if it is desired to launch the missile 10 from a "blind" launch, i.e., where both the aircraft 15 and its missile 10 are not in the line of sight of the target area, then the aircraft 15 can be flown at a relatively low altitude and below the horizon of the target area by any conventional navigational system, but along a path which would normally bring the aircraft 15 and its missile 10 over the target area. Prior to reaching the target area, for example, 25 or 30 miles away, the aircraft 15 would then be maneuvered to climb and concurrently the missile 10 launched in a direction toward the target area. The climbing maneuver of the aircraft 15 can then be continued until the target area comes within the line of sight of the antenna 14. Thereafter, the guidance system comtemplated herein operates as previously described.

Thus, there is provided, in accordance with the invention, novel guidance systems and methods for controlling a directionally controllable vehicle in its movement toward a selected target from a remote control point with an extremely high degree of accuracy and a minimum of equipment being required in the expendable vehicle.

As will be understood by those skilled in the art, the above described embodiment is meant to be merely exemplary and is susceptible of modification and variation without departing from the spirit and scope of the invention. Therefore, the invention is not deemed to be limited except as defined by the appended claims.

What is claimed is:

1. Apparatus for producing a map of a target area at a first station as observed from a second station, comprising transmitter means at one of said stations for transmitting radiant energy toward a target area, receiver means at the other of said stations for receiving radiant energy directly from said transmitter means and the radiant energy reflected from said target area, said transmitter and receiver means each including an antenna having a radiation pattern, means for scanning one of said radiation patterns over said target area, display means including a screen located at said first station and responsive to said receiver for displaying a map of the area scanned by said one pattern, said display means including means for moving a visual indication across said screen at a preselected rate, means responsive to the time interval between the direct and reflected radiant energy arriving at the receiving means for varying the intensity of said visual indication thereby indicating the range of said target area relative to said second station, and means for synchronizing the movement of said one radiation pattern and the movement of said visual indication whereby the location of said visual indication on said screen is representative of the bearing of said second station with respect to said target area.

2. Mapping apparatus according to claim 1, wherein the radiation pattern of said transmitter antenna is scanned over said target area.

3. Mapping apparatus according to claim 2, wherein said transmitter means is substantially closer to said target area than is said receiver means.

4. Apparatus for producing a map of a target area at a first station as observed from a moving body, comprising transmitter means at said moving body for transmitting radiant energy toward a target area, receiver means at said first station for receiving radiant energy directly from said transmitter means and the radiant energy reflected from said target area, said transmitter and receiver means each including an antenna having a radiation pattern, means for scanning the radiation pattern of said transmitter over said target area, display means located at said first station and responsive to said receiver for displaying a map of the area scanned by said transmitter radiation pattern, said display means including a cathode ray tube and means for moving a beam of electrons across the face of said tube at a preselected rate, means responsive to the time interval between the direct and reflected radiant energy arriving at the receiver means for varying the intensity of said beam thereby indicating the range of said target area relative to said second station, and means for synchronizing the movement of said transmitter radiation pattern and the movement of said beam whereby a visual location of said beam on the face of said tube is representative of the bearing of said moving body with respect to said target area.

5. Apparatus as claimed in claim 4, comprising selectively energizable means for providing a relatively narrow beam of radiant energy from said moving body to the target area having a direction fixed with respect to said moving body and pointing generally in the direction of said body's velocity vector for further illuminating the target area, said receiving means including means responsive to the reflected energy from said narrow beam for indicating the pitch orientation of the missile.

6. Apparatus as claimed in claim 5, further comprising selectively enabled means for rendering said selectively energizable means operative during predetermined portions of the terminal phase of the convergence of the moving body with the target area.

7. Apparatus as claimed in claim 6, wherein the first station comprises a moving aircraft.

8. A guidance system for use in remotely controlling a directionally controllable missile adapted to be launched from an aircraft in its movement toward a selected target within a predetermined target area of uncertainty relative to a known identification point from directional command means positioned in the aircraft, said aircraft being maintained in line of sight relative to the target area, comprising selectively controlled radar mapping means including selectively energizable radar transmitting means mounted on the missile for scanning the target area through a horizontal scanning sector of predetermined angular dimension to illuminate the target area with radiant energy having predetermined frequency characteristics and susceptible of reflection from objects within the target area, radar receiving means mounted on the launch aircraft and adapted to receive radiant energy of said predetermined frequency characteristics for scanning through a horizontal scanning sector having an angular dimension less than the predetermined angular dimension of said radar transmitting means scanning sector, image display means mounted in the launch aircraft responsive to said radar receiving means, and means for operating said radar receiving means to scan the illuminated target area to produce an image in said image display means of at least a portion of the sector of said target area illuminated by said radar transmitting means to provide information as to the azimuthal and pitch orientation of the controllable missile; selectively energizable auxiliary radar transmitting means mounted on the missile for providing a beam of radiant energy from the missile to the target area having a direction fixed with respect to the longitudinal axis of the missile and adapted to point in the direction of the missile's velocity vector for further illuminating the target area with radiant energy susceptible of being reflected from said illuminated target area toward the launch aircraft; means mounted on the missile and responsive to the operation of said radar transmitting means for transmitting a synchronizing signal to said radar receiving means in the launch aircraft for synchronizing the operation of said radar transmitting means and said radar receiving means; and command transmitting means operable at a frequency different from said predetermined frequency characteristics of said radiant energy from said radar transmitting means for selectively transmitting directional control signals to the missile for controlling the azimuthal orientation of the missile relative to the target, for selectively energizing said auxiliary radar transmitting means during predetermined portions of the terminal phase of the convergence of the controllable missile with the target, and for controlling the pitch orientation of the missile during the terminal phase of the convergence of the controllable missile with the target.

* * * * *